(12) United States Patent
Paillet et al.

(10) Patent No.: US 9,095,948 B2
(45) Date of Patent: Aug. 4, 2015

(54) THERMOPLASTIC MATERIAL

(75) Inventors: Romain Paillet, Charenton le Pont (FR); Yohann Felten, Charenton le Pont (FR); Yannick Gordiet, Charenton le Pont (FR); Jose Alcorta, Begles (FR); Maxime Olive, Talence (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 967 days.

(21) Appl. No.: 13/128,624

(22) PCT Filed: Nov. 4, 2009

(86) PCT No.: PCT/EP2009/064633
§ 371 (c)(1),
(2), (4) Date: Sep. 27, 2011

(87) PCT Pub. No.: WO2010/052248
PCT Pub. Date: May 14, 2010

(65) Prior Publication Data
US 2012/0017803 A1    Jan. 26, 2012

(30) Foreign Application Priority Data
Nov. 10, 2008  (EP) .................................. 08305794

(51) Int. Cl.
*B24B 13/005* (2006.01)
*C08L 93/02* (2006.01)
*C08L 93/04* (2006.01)

(52) U.S. Cl.
CPC ............. *B24B 13/0057* (2013.01); *C08L 93/02* (2013.01); *C08L 93/04* (2013.01)

(58) Field of Classification Search
CPC ... B24B 13/005; B24B 13/0057; C08L 93/02; C08L 93/04
USPC ...................................... 451/384, 388, 390, 42
See application file for complete search history.

(56) References Cited

U.S. PATENT DOCUMENTS

| | | | |
|---|---|---|---|
| 1,506,733 A * | 9/1924 | Bugbee ............................ 451/42 |
| 3,297,535 A | 1/1967 | Butler et al. |
| 5,096,969 A | 3/1992 | Payne et al. |
| 5,380,387 A * | 1/1995 | Salamon et al. ............... 156/154 |
| 5,754,269 A | 5/1998 | Benjamin et al. |
| 5,763,075 A | 6/1998 | Benjamin et al. |
| 6,036,313 A | 3/2000 | Benjamin et al. |
| 6,258,882 B1 | 7/2001 | Wachowiak, Jr. |
| 8,231,432 B1 * | 7/2012 | Sutton et al. ..................... 451/42 |
| 2012/0208036 A1 * | 8/2012 | Schneider et al. ............. 428/480 |

FOREIGN PATENT DOCUMENTS

| | | |
|---|---|---|
| JP | 2007-254571 | 10/2007 |
| WO | WO 97/10924 | 3/1997 |
| WO | WO 98/41359 | 9/1998 |
| WO | WO 99/11430 | 3/1999 |

* cited by examiner

Primary Examiner — Robert Rose
(74) Attorney, Agent, or Firm — Cozen O'Connor

(57) ABSTRACT

Use of a thermoplastic material for blocking an optical substrate (100) in a machining position, wherein the thermoplastic material is formulated from a composition comprising a shellac and a plasticizer where the shellac and the plasticizer are chosen so as to have the softening point of the thermoplastic material greater than or equal to 60° C. and smaller than or equal to 85° C.

19 Claims, 2 Drawing Sheets

THERMOPLASTIC MATERIAL

RELATED APPLICATIONS

This is a U.S. National Phase Application under 35 USC 371 of International Application PCT/EP2009/064633 filed on Nov. 4, 2009.

This Application Claims the Priority of European Application No. 08305794.3 filed Nov. 10, 2008, the entire content of which is hereby incorporated by reference.

FIELD OF THE INVENTION

This invention relates to a thermoplastic material for blocking in a machining position an optical substrate and a method of blocking an optical system.

BACKGROUND OF THE INVENTION

The process of preparing optical or ophthalmic lenses begins usually with an unfinished or semi-finished glass or plastic lens blank. Typically a semi-finished lens blank has a finished polished front surface and an unfinished back surface. By grinding away material from the back surface of the lens blank the required corrective prescription is generated. Thereafter the surface, having had the corrective prescription imparted thereto, is polished and the peripheral edge of the thus processed lens blank is provided with a final desired contour thereby establishing a finished optical or ophthalmic lens. According to other processing methods, the finished ophthalmic lens can be directly processed from a lens blank using for example three directional machining. The lens blank can be either a plastic or a glass lens blank.

It is necessary during these various processing operations to securely maintain the lens blank in accurate alignment and in place on the lens blocking device. This procedure is often referred to as "lens blocking".

Heretofore, various materials were employed to secure the lens blank to the lens blocking device. These materials include glues, pitch and low temperature fusible metal alloys. The use of glues and pitch, in addition to being messy, suffers the further disadvantage of generally being non-reusable or non-reclaimable. While the prior art use of low temperature metal alloys eliminated some of these disadvantages experienced with the use of glues and pitch, nonetheless, the use of these metal alloys, both in their preparation and their reclamation caused significant environmental and health hazards especially since these alloys were most often fabricated from such metals as cadmium, tin, lead and bismuth. Of these metals, lead and cadmium are the most toxic. Lead is strong protoplasmic poison and can be introduced into the body by ingestion, inhalation and skin absorption. Cadmium poisoning is similar to lead in many ways and is introduced into the body in the same way as lead. Like lead, cadmium is stored in the liver, kidney and bone. Procedures for the formulation of such alloys and reclamation processes so as to enable its re-use as a material to secure a lens blank to a lens block thus exposes workers to serious environmental and health hazards. The formation of these alloys often is accomplished through the use of powdered or particulate metals which are subjected to a sintering and heat treating process. Fumes and/or dust particles of these metals are released to the ambient atmosphere thereby creating environmental and health hazards for those formulating these alloys. The same hazards exist for those attempting to reclaim the used low temperature metal alloy blocking material.

To overcome these issues, organic low shrinkage materials have been developed to be used as lens blocking materials.

U.S. Pat. No. 6,036,313 in the name of 3M Innovative Properties Company discloses examples of compound families suitable for lens blocking with thermoplastic materials.

The disclosed blocking compositions have many advantages over traditional metal alloy materials. For example, the lens blocking compositions are non-toxic, environmentally safe, and preferably biodegradable. The materials preferably can be used with existing processing equipment and may be recycled. An optical lens blocking device can be used that comprises a solidified mass of a thermoplastic blocking composition. The blocking composition is solid at 21° C. and has a low melting point.

There remains a need for improving blocking material for blocking a lens blank to a lens blocking device thanks a cheap, non-toxic and easy to handle material.

SUMMARY OF THE INVENTION

One aspect of the invention relates to a thermoplastic material formulated from a composition comprising a shellac and a plasticizer where the shellac and the plasticizer are chosen so as to have the softening point of the thermoplastic material greater than or equal to 60° C. and smaller than or equal to 85° C. and to the use of such thermoplastic material for blocking an ophthalmic substrate in a machining position.

The inventors have noticed that the thermoplastic blocking compositions disclosed in U.S. Pat. No. 6,036,313, are hard to handle because they go through sharp transitions from a solid state to a molten state without going gradually through a softening transition.

The thermoplastic material according to an embodiment of the invention presents a softening point at a temperature compatible with the blocking method for blocking an ophthalmic lens. Therefore, the thermoplastic material according to the embodiment may be heated. For example the thermoplastic material may be heated at a temperature between 55° C. and 60° C. without going through a sharp transition from a solid state to a molten state.

According to further embodiments of the invention, the thermoplastic material may comprised one or any possible combinations of the following features:

- the shellac and plasticizer are chosen so as to have the hardness of the thermoplastic material at room temperature greater than or equal to 40 when measured using the Shore D method;
- the composition comprises, as a percentage by weight of the thermoplastic material, at least or equal to 60% and at most or equal to 80% of shellac;
- the composition comprises, as a percentage by weight of the thermoplastic material, at least or equal to 20% and at most or equal to 40% of plasticizer;
- the shellac comprises waxed shellac and/or dewaxed shellac and/or bleached shellac;
- the plasticizer comprises, as a percentage by weight of the plasticizer, at least or equal to 80% of rosin or modified rosin;
- the plasticizer comprises, as a percentage by weight of the plasticizer, at least or equal to 80% of ester of rosin;
- the plasticizer comprises, as a percentage by weight of the plasticizer, at least or equal to 80% of hydrocarbon-based resin; and
- the plasticizer comprises, as a percentage by weight of the plasticizer, at least or equal to 80% of C5 aliphatic hydrocarbon resin.

Another aspect of the invention relates to a use of a thermoplastic material according to the invention as blocking material for blocking an optical substrate in a machining position.

Another aspect of the invention relates to a preformed optical substrate block comprising a thermoplastic block used to allow an optical substrate to be blocked on the preformed optical substrate block wherein the thermoplastic block is made of a thermoplastic material having a softening point greater than or equal to 60° C. and smaller than or equal to 85° C.

The thermoplastic material may be a thermoplastic material according to an embodiment of the invention.

The preformed optical substrate block according to an embodiment of the invention may be an entire preformed optical substrate block where the preformed optical substrate block and the thermoplastic block are a single part made of a thermoplastic material.

The preformed optical substrate block according to an embodiment of the invention may be provided without a hole, for example without a central hole, for example without a hole in which a moving hollow tube is placed.

Another aspect of the invention relates to a method for blocking an optical substrate in a machining position using a thermoplastic material according to an embodiment of the invention.

Another aspect of the invention relates to a method of blocking an optical substrate to be machined comprising the steps of:
- an optical substrate providing step in which a optical substrate (100) is provided;
- a preformed optical substrate block providing step in which a preformed optical substrate block (300) is provided;
- a surface heating step in which a surface of the preformed substrate block (300) is heated at a docking temperature greater than or equal to 50° C. and smaller than or equal to 60° C., for example 10° C. to 25° C. below the softening temperature of the thermoplastic material;
- a docking step in which the optical substrate is docked to the heated surface of the preformed substrate block (300) so as to be positioned in a machining position;

wherein the preformed optical substrate block (300) is according to the invention.

The method according to an embodiment of the invention may comprise using as thermoplastic material a thermoplastic material according to the invention.

Advantageously, the use of a thermoplastic material according to an embodiment of the invention allows reducing the required heat amount for the blocking step.

Furthermore, only a local area of the blocking material needs to be heated. Therefore, the stress suffered by the optical substrate when cooling the blocking material is reduced when using a blocking material according to the invention.

Advantageously, the optical and cosmetic properties of the optical substrate are enhanced.

According to the present invention, an "optical substrate" may be an optical lens which surfaces have already been machined, a semi-finished lens blank with a polished front surface, a lens blank with two unfinished surfaces.

The optical substrate can be made for example, but not limited to, of plastic or glass. More generally, any combination of material suitable to obtain an optical system may be used. One or two surfaces of the optical substrate may be coated.

Thus an "optical substrate" of the invention can be every optical part that needs to be machined, as for example to be cut and/or grinded and/or polished and/or edged and/or engraved, in order to provide a machined optical substrate, for example an optical or ophthalmic lens.

In the sense of the invention "Shellac" is a resin made of Lac. Lac being the scarlet resinous secretion of a number of species of Lac-producing insects, the most commonly cultivated of which is *Kerria lacca*.

In the sense of the invention the "softening point" is measured using the well known "ball-ring" method as described in standard NF EN 1238 "Determination of the softening point of thermoplastic adhesives"—December 1999.

According to the well known "ball-ring method", a steel ball of a given dimension, for example 9.53 mm, and mass, for example 3.5 g, is placed on a sample of thermoplastic material contained on a metal ring of specified dimensions. The apparatus is heated at a constant rate, for example 5° C./min from at least 10° C. below the expected softening point. The "softening point" corresponds to the temperature at which the sample is sufficiently soft to allow the ball to pass through the metal ring.

In the sense of the invention the "hardness" corresponds to the Shore "D" hardness, using the measuring method described in standard ASTM D2240.

In the sense of the invention "machining an optical substrate" may correspond to manufacturing and/or polishing and/or grinding and/or edging the optical substrate.

BRIEF DESCRIPTION OF THE DRAWINGS

Non limited embodiments of the invention will now be described with reference to the accompanying drawing wherein.

DETAILED DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

The wording "upper" or "on" and "bottom" or "under" indicates positions relative to the optical lens when it is arranged so as the edge of the optical lens to be machined is substantially situated in a horizontal plane.

Said position is purely conventional and the optical lens can be machined in a non horizontal position.

Figure 1:
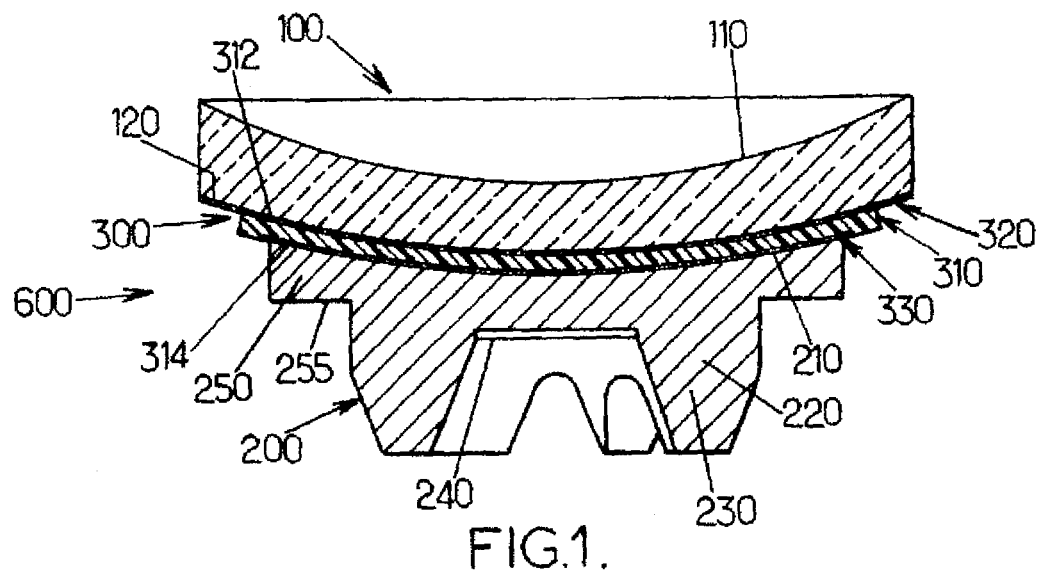
FIG. 1 is a cross sectional view of an optical lens fixed on a preformed optical substrate block according to a first embodiment of the invention.

As shown on FIG. 1, an optical lens 100 is secured on a preformed optical substrate block 600 comprising a thermoplastic block 300 made of a thermoplastic material. The thermoplastic material has a softening point greater than or equal to 60° C., for example greater than or equal to 70° C. and smaller than or equal to 85° C. According to an embodiment of the invention, the thermoplastic material has a softening point different than 75° C., for example greater than 75° C. and smaller than or equal to 85° C.

The edge of said optical lens 100 is substantially situated in a horizontal plane.

The upper surface 110 of the optical lens 100 is a surface to be machined, as for an example to be ground and/or polished. The optical lens 100 can be further edged.

The bottom surface 120 of the optical lens 100 contacts the upper surface of the thermoplastic block 300.

According to an embodiment, the optical lens 100 is a semi-finished lens blank and the bottom surface 120 is a finished optical surface.

As for an example, the external diameter of the optical lens 100 is between 50 mm and 100 mm, for example equal to 80 mm.

According to an embodiment of the invention, the preformed optical substrate block 600 further comprises a holding unit 200 in a material being in a solid state at temperatures up to 100° C., for example up to 150° C. The holding unit 200 may be a metallic part which comprises a bottom part 230, 220 and an upper part 250.

The lower part of bottom part 230 of the holding unit 200 may comprise means to orient the preformed optical substrate block 600 in corresponding orienting means of a tool (not represented) of a lens machining unit such as a lathe or another movement inducing machine. Said tool may be a chuck or another fixing tool.

Internal surface 240 of the holding unit 200 may contact an upper surface of said tool.

The bottom part of the holding unit 200 also comprises a central part 220 which is a cylindrical part to be squeezed by said fixing tool of the machining unit.

Upper part 250 has an external diameter larger than the diameter of the central part 220 and its bottom surface 255 may lay on the upper surface of the tool of the lens machining unit and may comprise positioning means. The upper part 250 also comprises an upper assembling surface 210.

As for an example the diameter of the upper part 250 is 70 mm, the diameter of the central part 220 is 43 mm and the height of the holding unit 200 is between 20 mm and 30 mm.

According to an embodiment of the invention the thermoplastic block 300 is made of a thermoplastic material formulated from a composition comprising a shellac and a plasticizer where the shellac and the plasticizer are chosen so as to have the softening point of the thermoplastic material greater or equal to 60° C., for example greater or equal to 70° C. and smaller or equal 10 to 85° C.

Advantageously, the thermoplastic material according to the invention presents a softening point and does not go through a sharp transition from a solid state to a molten state. Therefore, the thermoplastic material according to the invention when heated at a temperature greater or equal to 60° C. and smaller or equal to 85° C., keeps its shape unlike the thermoplastic disclosed in U.S. Pat. No. 6,036,313.

According to an embodiment of the invention, the thermoplastic block 300 is arranged between the upper assembling surface 210 and the bottom surface 120 of the optical lens 100 in a three stacked layers arrangement where:
- the first layer is an adhesive tape 330 which bottom surface is fixed on upper assembling surface 210;
- the second layer is the thermoplastic block 300 which bottom surface 314 is arranged on the upper surface of the adhesive tape 330;
- the third layer is an adhesive tape 320 which bottom surface is arranged on the upper surface 312 of the thermoplastic block 300;
- the bottom surface 120 of the optical lens is fixed on the upper surface of the adhesive tape 320.

According to an embodiment, the adhesive tapes 320, 330 have a pressure-sensitive adhesive surface and a tack-free adhesion promoting surface. The tapes 320, 330 assist in the firm bonding of the optical lens 100 to the thermoplastic block 300 and to the holding unit assembling surface 210.

According to an embodiment, the tapes are conformable, that is, they follow the curvature of the lens blanks without any wrinkles or air bubbles; and translucent, that is, they permit light to pass there through. As a result, the lens may be visually aligned in the appropriate device prior to blocking. Still further, when the tapes are removed from the lens, they leave virtually no adhesive residue. Thus, messy and time consuming cleaning operations need not be performed on the lens before it can be used.

Despite this clean removability, suitable tapes may exhibit excellent adhesion to the optical lens, to the thermoplastic block and to the holding unit. Additionally, the tapes may be able to withstand the shear forces encountered during the machining operations. As a result, lenses are held in accurate position throughout these operations. An added benefit offered by using an adhesive tape is the protection provided to the optical lenses from thermal and mechanical shock.

The composition of the exposed surface of the tape (i.e., the non-adhesive surface away from the optical lens or from the upper assembling surface of the holding unit) may be selected so as to achieve the desired degree of adhesion with a particular thermoplastic material.

Examples of suitable tapes are given in previously cited U.S. Pat. No. 6,036,313.

The thermoplastic material should preferably be hard enough at its use temperature to function in the manner intended. For example, the thermoplastic material, when used to form a complete block, should be hard enough to withstand the forces and stresses imparted during the typical lens processing procedure, including any forces and stresses imparted to the composition during mounting and unmounting from the lens processing machinery as well as any forces imparted to the composition during the actual grinding or finishing operation. Compositions that deform or flow appreciably during these operations may be unsuitable. Suitable thermoplastic materials are solid at temperatures near or below room temperature. Preferred thermoplastic materials are solid at temperatures below about 40° C., more preferred thermoplastic materials are solid at temperatures below about 45° C., and most preferred thermoplastic materials are solid at temperatures below about 50° C.

Figure 3:
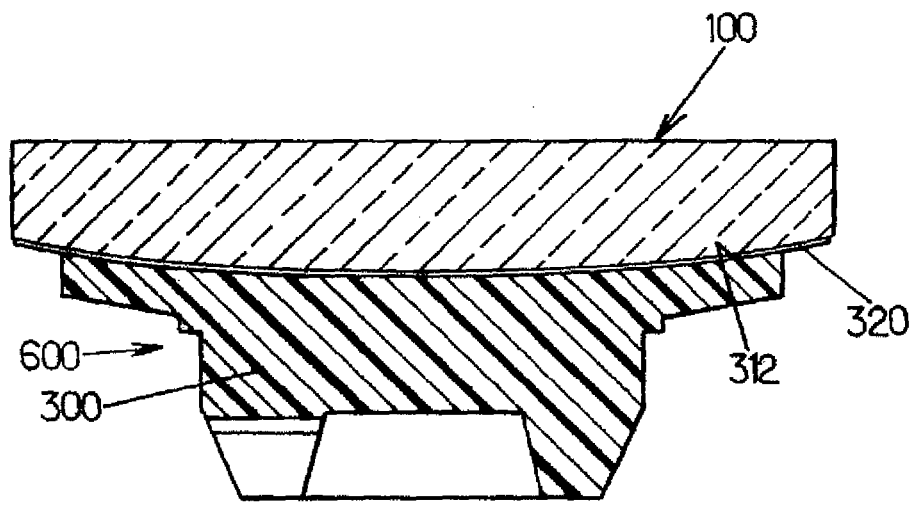
FIG. 3 is a cross sectional view of an optical lens fixed on a preformed optical substrate block according to a second embodiment of the invention.

According to an embodiment of the invention illustrated on FIG. 3, the preformed optical substrate block 600 and the thermoplastic block 300 are a single part made of a thermoplastic material.

Advantageously, the use and storage of such preformed optical substrate block 300, 600 are easier than when the preformed optical substrate block 600 is provided in two parts.

The thermoplastic material has a softening point greater than or equal to 60° C., for example greater than or equal to 70° C. and smaller than or equal to 85° C. According to an embodiment of the invention, the thermoplastic material has a softening point different than 75° C., for example greater than 75° C. and smaller than or equal to 85° C.

The optical substrate 100 may be docked directly on the upper surface of the preformed optical substrate block 600. According to an embodiment of the invention, the optical substrate may be provided with an adhesive tape 320 on the bottom surface 120 of the optical lens 100.

Figure 4:
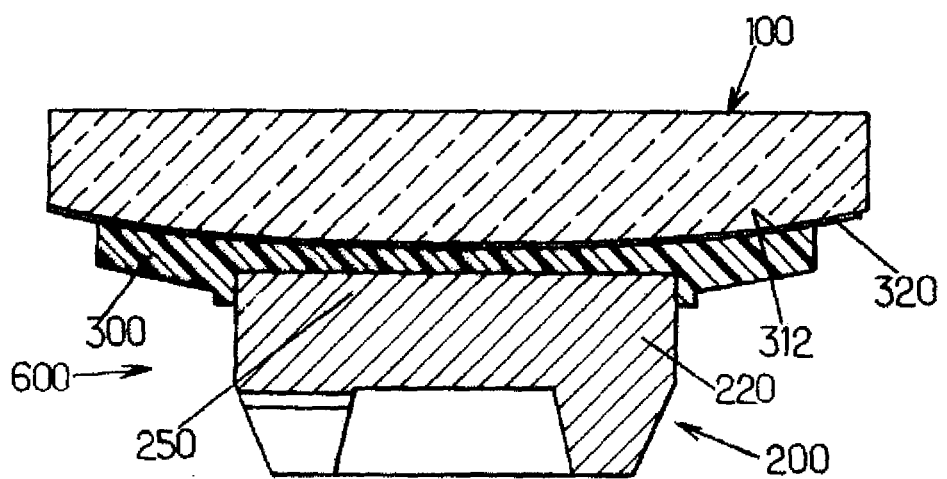
FIG. 4 is a cross sectional view of an optical lens fixed on a preformed optical substrate block according to a third embodiment of the invention.

According to an embodiment of the invention illustrated on FIG. 4, the upper part 250 of the holding unit 200 may have an external diameter significantly equal to the external diameter of the central part 220. The thermoplastic block 300 is arranged so as to cover at least part of the upper portion 250 of the holding unit 200. The invention also relates to a manufacturing method for manufacturing a preformed optical substrate block according to the invention.

According to an embodiment of the manufacturing method of the invention, the single block preformed optical substrate block may be manufactured by providing the thermoplastic material, heating the thermoplastic material at a temperature where the thermoplastic may flow under moderate pressure, injecting the flowing thermoplastic under pressure into a mold corresponding to the desired shape of the final block and cooling the mold holding the thermoplastic to room temperature. The temperature where the thermoplastic material may flow under moderate pressure may be greater than 100° C.

According to an embodiment of the manufacturing method according to the invention, the single block preformed optical substrate block may be manufactured by sintering the thermoplastic material in a mold corresponding to the desired shape of the final preformed optical substrate block.

The inventors have noticed that after the cooling step, the ejection the sole thermoplastic block from the mold presents some difficulties. Indeed, the thermoplastic material may stick on the sides of the mold.

To overcome this difficulty the inventors have covered the internal sides of the mold with a silicon liner prior to introducing the thermoplastic material in the mold.

According to an embodiment of the manufacturing method according to the invention, the preformed optical substrate block may be obtained by providing the thermoplastic material into an open mold corresponding to the desired surface of the upper surface of the thermoplastic block, heating the thermoplastic material in the mold to a temperature at least equal to the softening temperature of the thermoplastic material, applying on the free surface of the thermoplastic block a holding unit, cooling to room temperature the mold holding the preformed optical substrate block.

The upper surface of the holding unit may be provided with an adhesive tape layer as explained in detailed here above.

Furthermore, the inventors have noticed that separating the optical substrate from the thermoplastic blocking material is an issue. The deblocking step comprises ordinarily a hammering step. During the hammering step the optical substrate is struck with a mallet so as to generate a crack at the interface between the thermoplastic blocking composition and the lens blank.

The inventors have noticed that it is very difficult to deblock an optical substrate using a hammering step when the optical substrate is blocked with a thermoplastic material as disclosed in U.S. Pat. No. 6,036,313.

The inventors have observed that when the thermoplastic material has a Shore D hardness at room temperature greater or equal to 40, the hammering step is more successful.

Thus, according to an embodiment of the invention, the thermoplastic material may comprise shellac and/or plasticizer chosen so as to have the hardness of the thermoplastic material at room temperature greater or equal to 40, for example greater or equal to 50, for example greater or equal to 60.

The thermoplastic material according to the invention may be formulated from a composition comprising as a percentage by weight of the thermoplastic material, at least or equal to 60%, for example at least or equal to 65% and/or at most or equal to 80%, for example at least or equal to 75%, of shellac and/or at least or equal to 20%, for example at least or equal to 25% and/or at most or equal to 40%, for example most or equal to 35%, of plasticizer.

Surprisingly, the inventors have observed that when the shellac and the plasticizer are mixed in such proportions the thermoplastic material has physical properties, for example a softening point and hardness, appropriate to be used as a blocking material for optical substrates and offering a suitable temperature range for blocking.

The thermoplastic material according to the invention may be formulated from a composition comprising a wide variety of additives depending upon the desired end use. Suitable additives include solvents, diluents, plasticizers, pigments, dyes, inorganic and organic fibrous or particulate reinforcing or extending fillers, nucleating agents, thixotropic agents, indicators, inhibitors, stabilizers, UV or IR absorbers, and the like.

According to an embodiment of the invention, the thermoplastic material composition may comprise, as a percentage by weight of the thermoplastic material, at most or equal to 10%, for example at most or equal to 5%.

The shellac selected may comprise waxed shellac and/or dewaxed shellac and/or bleached shellac.

According to an embodiment of the invention the plasticizer may comprise at least 80%, for example at least 95%, of rosin or modified rosin. The modified rosin may be ester of rosin, for example triethylene glycol ester of stabilized gum rosin or Resiester T3 sold by Luresa.

According to another embodiment of the invention the plasticizer comprises at least 80%, for example 95% of hydrocarbon-based resin. The hydrocarbon-based resin may be C5 aliphatic hydrocarbon resin, for example the Wingtack 10 sold by Cray Valley.

The invention also relates to the use of a thermoplastic material of the invention for blocking in a machining position an optical substrate, for example to be manufactured and/or edged and/or grinded.

Figure 2:
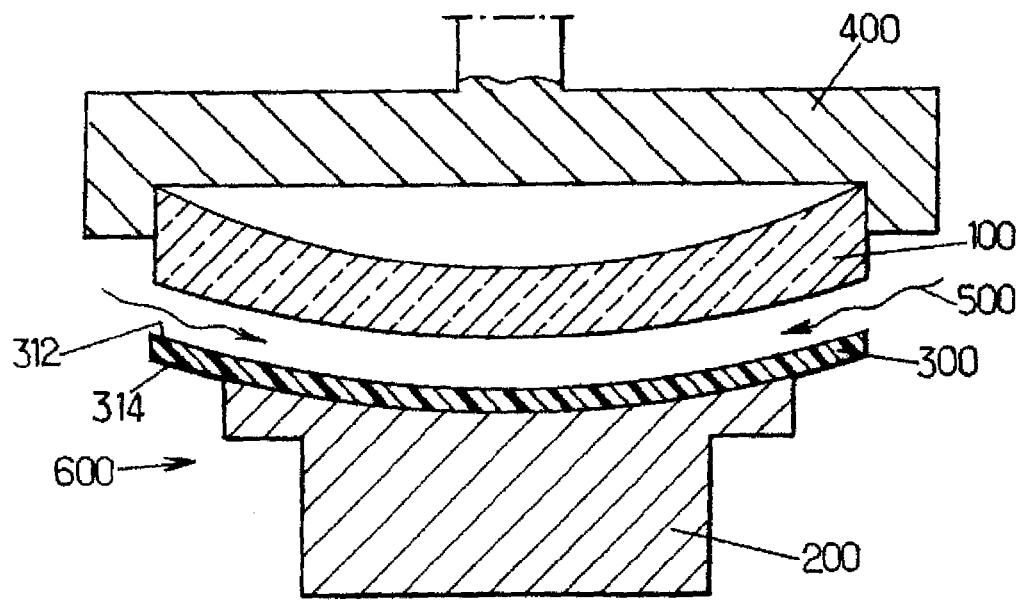
FIG. 2 is a cross sectional view of a surface heating step of a process according to an embodiment of the invention.

According to an embodiment of the present invention, and as illustrated on FIG. 2, an optical substrate, for example an optical lens 100 is provided using providing means 400.

A preformed substrate block 300 made of a thermoplastic material is also provided.

The optical lens 100 may be positioned in a machining position, for example a manufacturing position and/or edging position and/or grinding position.

Before docking the optical lens 100, the preformed substrate block 300 is locally heated.

According to an embodiment of the invention, the upper surface 312 of the preformed substrate block 300 is heated through heating means 500, so as to let a zone of the thermoplastic material soften. The heating means 500 may be any known heating means, for example using UV or preferably IR lamps.

The optical lens 100 is then placed on the partly soften thermoplastic material and moderate pressure is applied onto the optical lens 100. For example, the moderate pressure may correspond to manual pressure. The optical lens 100 is securely blocked after the cooling of the thermoplastic material and the optical lens is machined using conventional tools. The lower surface 314 remains in a solid state.

The blocking material should keep its shape when heated at a given temperature, while being sufficiently softened at the given temperature to fit the shape of the optical substrate upon moderate pressure.

The blocking material may then be cooled, for example said material may be left at room temperature for 10 to 15 min.

After machining the optical lens, the machined optical lens is deblocked and detached from the holding unit 200.

Advantageously, the use of a thermoplastic material according to the invention allows the deblocking step to comprise a hammering step.

The following examples are offered to illustrate the advantageous of the thermoplastic material according to the invention and are not to be considered as limiting the scope thereof. Unless indicated otherwise, all parts and percentages are by weight.

The thermoplastic material composition used for the following examples have been obtained by using different types of shellac and the triethylene glycol ester of stabilized gum rosin or Resiester T3 sold by Luresa as plasticizer.

The thermoplastic material used for the following examples have been obtained by first introducing the shellac in a kneader at a temperature of 130° C. The Resiester T3 has then been introduced in the kneader. The kneader is then turned on for 30 min at 130° C. so as to obtain a homogenous mixture of the shellac and the Resiester T3.

Table 1 indicates the measured softening temperature of different thermoplastic material according to the invention. The softening point has been measured using the "ball-ring" method as described in standard NF EN 1238.

TABLE 1

|  | Waxed shellac | Dewaxed shellac | Bleached shellac |
| --- | --- | --- | --- |
| % of Resiester T3 | 40.2 | 41.9 | 36.3 |
| Softening point (° C.) | 78.5 | 79.4 | 80.8 |

As illustrated in table 1, the thermoplastic materials according to the invention have a softening point and there softening point is greater or equal to 60° C. and/or smaller or equal to 85° C.

Table 2 compares the measured hardness at room temperature of thermoplastic materials according to the invention with a polycaprolactone thermoplastic material as disclosed in U.S. Pat. No. 6,036,313 and with a metal alloy.

The metal alloy comprises as a percentage by weight of the alloy: 44.7% of Bismuth (Bi), 22.6% of Lead (Pb), 8.3% of Tin (Sn), 5.3% of Cadmium (Cd) and 19.1% of Indium (In).

TABLE 2

| reference | Shore D Hardness |
| --- | --- |
| Waxed shellac/Resiester T3 (70/30) | 55 |
| Waxed shellac/Resiester T3 (75/25) | 60 |
| Dewaxed shellac/Resiester T3 (70/30) | 55 |
| Dewaxed shellac/Resiester T3 (75/25) | 68 |
| Bleached shellac/Resiester T3 (70/30) | 40 |
| Bleached shellac/Resiester T3 (75/25) | 60 |
| polycaprolactone thermoplastic | 35 |
| Metal alloy 117 | 73 |

As illustrated in table 2, the thermoplastic materials according to the invention have a Shore D hardness greater than the thermoplastic material disclosed in U.S. Pat. No. 6,036,313.

Furthermore, as illustrated in table 2, the thermoplastic material according to the invention having a about 75% of shellac have a shore D hardness close to the one of the metal alloy 117.

Advantageously, the optical substrate blocked using a thermoplastic material according to the invention may be deblocked using a hammering method.

The invention has been described above with the aid of embodiments without limitation of the general inventive concept. In particular the present invention provides a method for blocking and/or deblocking all kinds of optical lenses, particularly ophthalmic lenses, e.g. single vision (spherical, torical), bi-focal, progressive, aspherical lenses (etc.), semi-finished optical lenses and/or blanks, blanks for manufacturing optical lenses.

The invention claimed is:

1. A method of blocking an optical substrate in a machining position, the method comprising:
   heating a thermoplastic material formulated from a composition comprising a shellac and a plasticizer, wherein the shellac and the plasticizer are chosen so as to have the softening point of the thermoplastic material greater than or equal to 60° C. and less than or equal to 85° C.; and
   docking the optical substrate to the thermoplastic material so as to be positioned in a machining position.

2. The method of claim 1, wherein the shellac and plasticizer are chosen so as to have the hardness of the thermoplastic material at room temperature greater than or equal to 40 when measured using the Shore D method.

3. The method of claim 1 wherein the composition comprises, as a percentage by weight of the thermoplastic material, at least or equal to 60% and at most or equal to 80% of shellac.

4. The method of claim 1, wherein the composition comprises, as a percentage by weight of the thermoplastic material, at least or equal to 20% and at most or equal to 40% of plasticizer.

5. The method of claim 1 wherein the shellac comprises at least one of waxed shellac, dewaxed shellac, and bleached shellac.

6. The method of claim 1 wherein the plasticizer comprises, as a percentage by weight of the plasticizer, at least or equal to 80% of rosin or modified rosin.

7. The method of claim 6, wherein the plasticizer comprises, as a percentage by weight of the plasticizer, at least or equal to 80% of ester of rosin.

8. The method of claim 1 wherein the plasticizer comprises, as a percentage by weight of the plasticizer, at least or equal to 80% of hydrocarbon-based resin.

9. The method of claim 1, wherein the plasticizer comprises, as a percentage by weight of the plasticizer, at least or equal to 80% of C5 aliphatic hydrocarbon resin.

10. A preformed optical substrate block comprising a thermoplastic block used to allow an optical substrate to be blocked on the preformed optical substrate block wherein the thermoplastic block is formulated from a composition comprising a shellac and a plasticizer where the shellac and the plasticizer are chosen so as to have the softening point of the thermoplastic material greater than or equal to 60° C. and less than or equal to 85° C.

11. The preformed optical substrate block according to claim 10, wherein the shellac and plasticizer are chosen so as to have the hardness of the thermoplastic material at room temperature greater than or equal to 40 when measured using the Shore D method.

12. The preformed optical substrate block according to claim 10, wherein the composition comprises, as a percentage by weight of the thermoplastic material, at least or equal to 60% and at most or equal to 80% of shellac.

13. The preformed optical substrate block according to claim 10, wherein the composition comprises, as a percentage by weight of the thermoplastic material, at least or equal to 20% and at most or equal to 40% of plasticizer.

14. The preformed optical substrate block according to claim 10, wherein the shellac comprises at least one of waxed shellac, dewaxed shellac, and bleached shellac.

15. The preformed optical substrate block according to claim 10, wherein the plasticizer comprises, as a percentage by weight of the plasticizer, at least or equal to 80% of rosin or modified rosin.

16. The preformed optical substrate block according to claim 15, wherein the plasticizer comprises, as a percentage by weight of the plasticizer, at least or equal to 80% of ester of rosin.

17. The preformed optical substrate block according to claim 10, wherein the plasticizer comprises, as a percentage by weight of the plasticizer, at least or equal to 80% of hydrocarbon-based resin.

18. The preformed optical substrate block according to claim 10, wherein the plasticizer comprises, as a percentage by weight of the plasticizer, at least or equal to 80% of C5 aliphatic hydrocarbon resin.

19. A method of blocking an optical substrate to be machined, the method comprising the steps of:
- an optical substrate providing step in which an optical substrate is provided;
- a preformed optical substrate block providing step in which a preformed optical substrate block is provided, wherein:
  - the preformed optical substrate block comprises a thermoplastic block configured to allow an optical substrate to be blocked on the preformed optical substrate block,
  - the thermoplastic block is formulated from a composition comprising a shellac and a plasticizer where the shellac and the plasticizer are chosen so as to have the softening point of the thermoplastic material greater or equal to 60° C. and less than or equal to 85° C.;
- a surface heating step in which a surface of the preformed substrate block is heated at a docking temperature that is 10° C. to 25° C. less than the softening temperature of the thermoplastic material; and
- a docking step in which the optical substrate is docked to the heated surface of the preformed substrate block so as to be positioned in a machining position.

* * * * *